United States Patent [19]

Blurock et al.

[11] 4,274,297
[45] Jun. 23, 1981

[54] SPINDLE DRIVE MECHANISM WITH CIRCULATING BALLS

[75] Inventors: Günter Blurock, Niederwerrn; Ernst Albert, Sand, both of Fed. Rep. of Germany

[73] Assignee: Deutsche Star Kugelhalter GmbH, Schweinfurt, Fed. Rep. of Germany

[21] Appl. No.: 6,483

[22] Filed: Jan. 25, 1979

[30] Foreign Application Priority Data

Feb. 7, 1978 [DE] Fed. Rep. of Germany ....... 2805141

[51] Int. Cl.³ .............................................. F16H 29/20
[52] U.S. Cl. .................. 74/424.8 R; 74/459; 74/89.15
[58] Field of Search ............... 74/424.8 R, 424.8 A, 74/424.8 NA, 424.8 B, 459

[56] References Cited
U.S. PATENT DOCUMENTS

| | | | |
|---|---|---|---|
| 888,619 | 5/1908 | Kelly | 74/424.8 R |
| 2,069,471 | 2/1937 | Baker | 74/459 |
| 2,082,433 | 6/1937 | Whitcomb | 74/459 |
| 2,694,942 | 11/1954 | Hellen | 74/459 |
| 3,186,250 | 6/1965 | Boutwell | 74/459 |
| 3,577,796 | 5/1971 | Eissfeldt | 74/459 |

FOREIGN PATENT DOCUMENTS

| | | | |
|---|---|---|---|
| 621168 | 8/1962 | Belgium | 74/424.8 A |
| 2166275 | 8/1976 | Fed. Rep. of Germany | |
| 562932 | 7/1944 | United Kingdom | 74/424.8 A |

Primary Examiner—C. J. Husar
Assistant Examiner—Conrad Berman
Attorney, Agent, or Firm—Toren, McGeady and Stanger

[57] ABSTRACT

A spindle and a spindle nut having external and internal threads, respectively, formed thereon and circulating balls operatively engaged between said threads operating to effect transmission of forces axially thereof when the spindle and spindle nut are rotated relative to each other. The balls are circulated through ball ducts formed by the threads and by the circulating means which return the balls from ball duct outlets of the threads to ball duct inlets thereof. Compensating means for enabling adjustment of the operating pressure between the spindle and the spindle nut by adjusting the diameter of the spindle nut enable compensation of the degree of play which is developed between the balls and the ball ducts through which the balls are circulated. In one aspect of the invention, the spindle nut is formed with a longitudinal slit thereby enabling adjustment of the diameter of the spindle nut and of the pressure by which it is engaged about the spindle.

34 Claims, 23 Drawing Figures

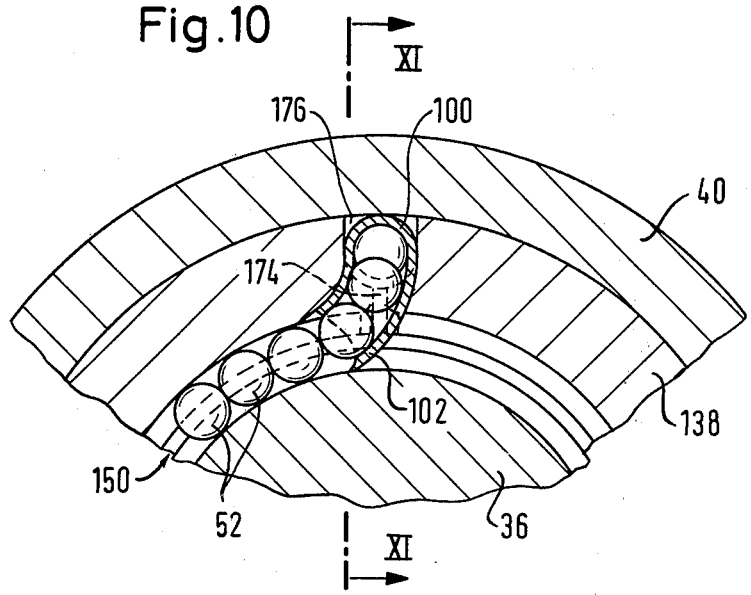
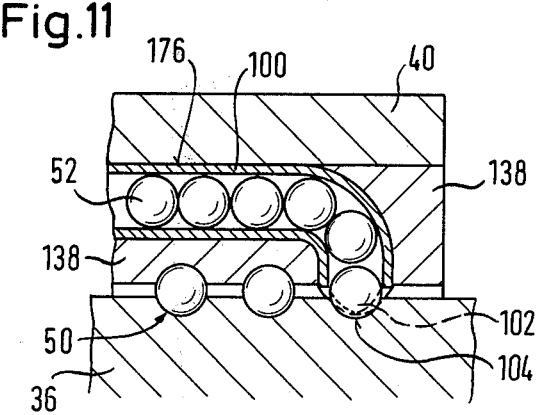

SPINDLE DRIVE MECHANISM WITH CIRCULATING BALLS

BACKGROUND OF THE INVENTION

The present invention relates generally to spindle drive mechanisms with circulating balls and more particularly to a mechanism wherein a spindle provided with an external thread, a spindle nut provided with an internal thread of equal pitch, and balls for transmitting axial forces between the spindle and the spindle nut are arranged with the balls within ball ducts formed by the internal and external threads. Means are provided to enable return of the balls from an outlet of the ball ducts to an inlet thereof with relative rotation between the spindle and the spindle nut operating to effect transmission of axial forces therebetween as the balls are circulated through the mechanism.

Spindle drives of this type are generally distinguished by the fact that they display low frictional resistance characteristics and relatively insignificant wear while allowing positioning of the structural components to be shifted with exactness and without play. The adjustment of an initial tension between the spindle and the spindle nut is of primary importance when the device is used as a feed device in connection with precision machine tools. In such devices, it is important, on the one hand, to ensure that the feed is accomplished without vibrations and rattling and, on the other hand, to eliminate reverse play when the feed direction is changed.

Spindle drives of the type mentioned above are known in the prior art. In such spindle drives, a spindle nut is formed from two parts which are arranged axially behind one another on the spindle and which are clamped together upon the spindle until any existing play is compensated or until a desired initial tension or pressure between the parts is achieved. An example of this type of construction is known from German Offenlegungsschrift No. 1,936,546. However, in all known constructions, having two-part nuts, the adjustment of the play or of the initial tension of the device is effected such that, with the parts of the nuts arranged rigidly against rotation relative to each other, their axial spacing is adjusted and fixed. Alternatively, with the partial nuts locked relative to each other in the axial direction, the partial nuts are arranged so as to be rotatable relative to each other and fixed in their angular positions wherein one of the partial nuts will always rest through the balls against one flank side, with the other partial nut resting against the other flank side of the spindle thread.

Arrangements having two partial nuts usually require a complicated structural configuration and assembly and they are, therefore, rather expensive. In addition, the structural length of such a device is relatively large so that they tend to require a relatively large space for assembly. Additionally, unavoidable pitch error of the spindle will have the effect of creating disadvantages in the operating characteristics which become more pronounced with larger lengths of the entire spindle nut. A further disadvantage of large structural lengths is the resulting high elastic deformation which occurs in the axial direction.

The present invention is directed toward the task of providing a structural arrangement for a spindle drive mechanism of the type discussed above which, when compared with known structures, will be relatively less complicated in its design and assembly and will exhibit a shorter structural length.

SUMMARY OF THE INVENTION

The basic structure of the invention involves a spindle drive mechanism which comprises a spindle having external threads thereon, a spindle nut having internal threads thereon, said external and internal threads being of equivalent pitch and defining therebetween ball ducts, with a plurality of circulating balls operatively engaged within the ball ducts for effecting transmission of axial forces between the spindle and the spindle nut upon relative rotative movement therebetween. Ball circulating means including means defining a ball inlet and a ball outlet for the ball ducts effects circulation of the balls through the ball ducts and between the ball duct outlet and inlet means. The invention is particularly directed toward the provision of compensating means for enabling the adjustment of the diametral dimension of the spindle nut in order to effect adjustment of the operating pressures between the spindle and the spindle nut thereby to provide compensation of the degree of play which exists between the balls and the ball duct means.

In accordance with the invention, there is provided a one-piece spindle nut, i.e. a spindle nut which is undivided transversely to the direction of the axis and which can be adjusted by reducing its diameter, with the threads of the spindle and the spindle nut being each constructed as grooves having flanks which converge obliquely at the bottom of the grooves, with the balls resting against the flanks always against two points of contact.

As a result of the arrangement of the invention, it is possible to compensate play between the spindle thread and the balls, on the one hand, and between the ball and the spindle nut thread, on the other hand, this compensation being effected by reducing the diameter of the spindle nut to such an extent that the balls, or at least the essential portions of all balls in both threads, rest against both flanks of the threads. Due to the fact that in the spindle as well as in the spindle nut both flanks always have a supporting function, that is each thread transmits forces in both feed directions, the required number of supporting balls is achieved with half the amount of threads required in the solution where two partial nuts are involved since in the latter each partial nut transmits forces only in one direction. In addition to the less complicated design and assembly which may be achieved by using only one spindle nut, there is also a significantly shorter structural length and, as a result, a reduced influence of the existence of possible pitch error on the spindle with reduced elasticity of the spindle nut in the axial direction. Both of these factors lead to a significant increase in the accuracy of the spindle drive.

In order to facilitate reduction of the diameter of the spindle nut, in accordance with the invention, the spindle nut may either be constructed with a relatively thin wall or it may be slotted essentially in the longitudinal direction. For the mechanism which effects the reduction, various structural solutions are provided. In accordance with a feature of the invention, the spindle nut has a conical outer surface and is surrounded by a sleeve having a corresponding conical inner surface. Means are provided to press the spindle sleeve axially onto the nut and to fix it in its position. To the extent or distance by which the spindle nut is pushed onto the sleeve, there will be a corresponding inner diameter so that the inner diameter may be continuously adjusted. In accordance with the invention, at both ends of the sleeve the conical surface is connected to two cylindrical sections which are each provided with an internal thread, with screw rings being provided which may be threadedly engaged into these internal threads for adjusting and fixing the axial position of the spindle nut in the sleeve.

In another embodiment of the invention, the spindle nut is formed with a cylindrical outer surface and there is also provided a sleeve which tightly embraces the spindle nut about its outer surface, the sleeve being provided with at least one longitudinal slot and with an inner surface which corresponds to the cylindrical outer surface of the spindle nut. The diameter of the sleeve is adjustable by means of screw connections or the like which bridge the longitudinal slot of the sleeve, with means being provided for axially fixing the spindle nut within the sleeve. In accordance with a further feature of the invention, the means for the axial fixation may be formed by a pair of locking rings or the like which engage grooves which are cut into the inner surface of the sleeve. According to a further feature of the invention, one of these locking rings may be replaced by a stop which is rigidly connected to the sleeve or which is constructed in one piece with the sleeve.

As already mentioned, the spindle nut may be slotted itself in order to maintain the forces for reducing the diameter of the spindle nut as low as possible. In this connection, in accordance with a feature of the invention, there is provided a spindle nut with at least one compensating slot which extends essentially in the longitudinal direction of the spindle drive mechanism. While a spindle nut with a single compensating slot is relatively easy to manufacture, a nut having several compensating slots tends to have improved roundness in various states of reduction of the diameter. Thus, in accordance with the invention, the compensating slots may extend along generating lines or obliquely relative to the spindle nut axis or they may be arranged spirally relative to the spindle nut axis.

In accordance with a further feature of the invention, the threads of the spindle and spindle nut may be advantageously shaped in the configuration of a pointed arch wherein two arched portions of the threads will basically comprise circular arches having radii which are larger than the radius of the balls. In the regions of contact with the balls, the flanks of the threads of the spindle and of the spindle nut are preferably inclined by about 45° relative to the spindle axis and the points of contact of the balls with the flanks of the threads are arranged on a 45° latitudinal circle relative to an equitorial plane which extends parallel relative to the spindle axis.

In accordance with another feature of the invention, the threads of the spindle nut are rounded in the region of the compensating slot or slots for the purpose of providing smooth passage of the balls.

A further feature of the invention provides that at least one of the compensating slots in the spindle nut, seen in cross section, is formed with a widened portion which serves as a duct for returning the balls. In another embodiment of the invention, it is provided that at least one of the slots in the spindle nut is constructed as an insert for receiving a deflection and/or return duct for the balls. In order to ensure that this insert does not impair the diameter reduction of the spindle nut, the insert is constructed elastically relative to its circumferential dimension or it may be inserted into the slot of the spindle nut with lateral play. The deflection and/or return ducts may be open radially outwardly or radially inwardly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 10 is a sectional view showing a representation in accordance with FIG. 7 of a further embodiment of the invention;

FIG. 11 is a sectional view taken along the line XI—XI of FIG. 10;

DETAILED DESCRIPTION OF THE PREFERRED EMBODIMENTS

Figure 1:
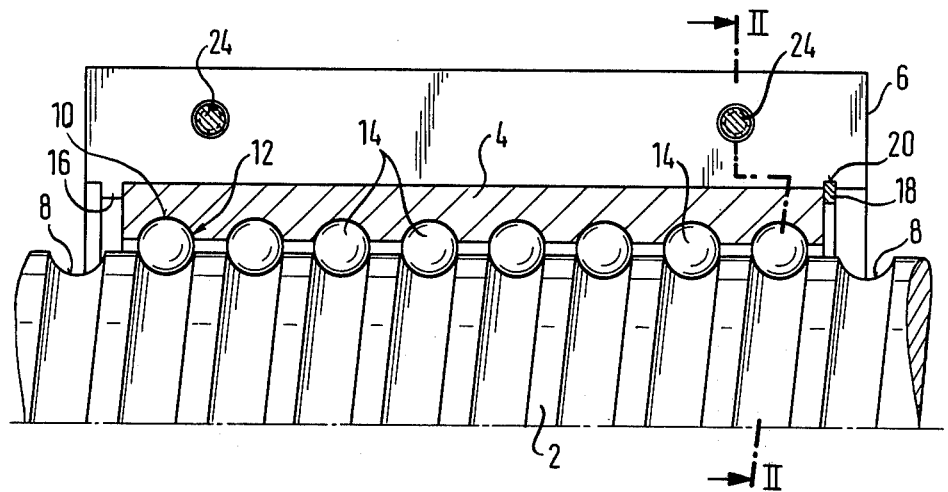
FIG. 1 is a longitudinal sectional view taken through a spindle drive mechanism in accordance with the invention.
Figure 2:
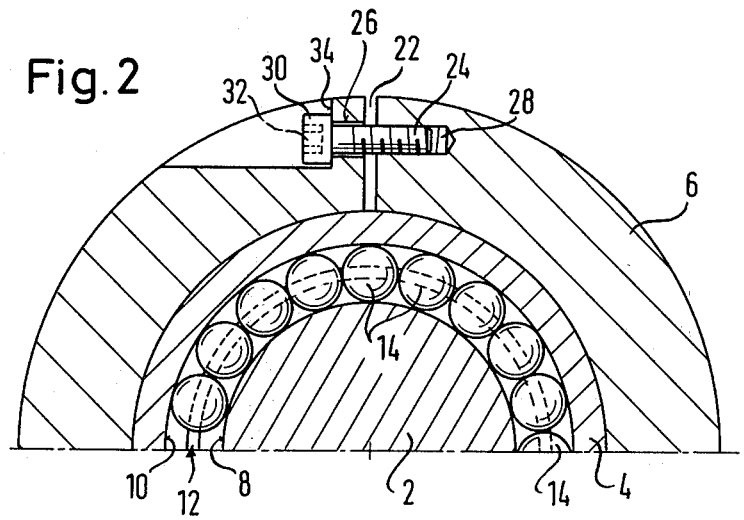
FIG. 2 is a sectional view taken along the line II—II of FIG. 1.

Referring now to the drawings wherein similar parts are identified by like references throughout the various figures thereof, there is shown a spindle drive mechanism with circulating balls, particularly illustrated in FIGS. 1 and 2, which comprises a spindle 2, a spindle nut 4 and a sleeve 6 surrounding the spindle nut 4. The spindle 2 is formed with an external thread 8 and the spindle nut 4 has an internal thread 10 of equivalent pitch. The external thread 8 and the internal thread 10 supplement each other to form a ball duct which spirally surrounds the spindle and which is filled with balls 14, in a manner known per se, for transmitting axial forces between the spindle and the spindle nut.

In the basic operation of the inventive spindle drive mechanism of the invention, the device is utilized, for example, in such a manner that the spindle 2 is rotatably supported with the nut 4 being prevented from rotating and being connected to a component which must be slidably moved in the axial direction of the spindle. Sliding or axial drive is effected by rotation of the spindle.

The spindle nut 4 is secured within the sleeve 6 in the axial direction, on the one hand by a stop collar 16 formed at the sleeve and on the other hand by a locking ring 18 which may engage a groove 20 formed in the sleeve 6.

As particularly shown in FIG. 2, the sleeve 6 is continuously slotted in the longitudinal direction. The resulting longitudinal slot 22 is bridged, for example, by a pair of screws 24 which project through bores 26 arranged in the sleeve portion to the left of the longitudinal sleeve 22 in FIG. 2 and which may be screwed into threaded holes 28 to the right of the longitudinal slot 22. The screw heads 30 which, for example, are provided with a hexagonal recess 32, rest against steps 34 which are worked or formed into the sleeve 6. By turning the screws 24, the sleeve 6 may be clamped together and thus the diameter of the relatively thin-walled spindle nut 4 may be reduced. As a result, the balls 14 are pressed against the flanks of the internal thread 10 and the external thread 8 and any play which may exist therebetween is compensated, as will be explained in greater detail hereinafter.

Figure 3:
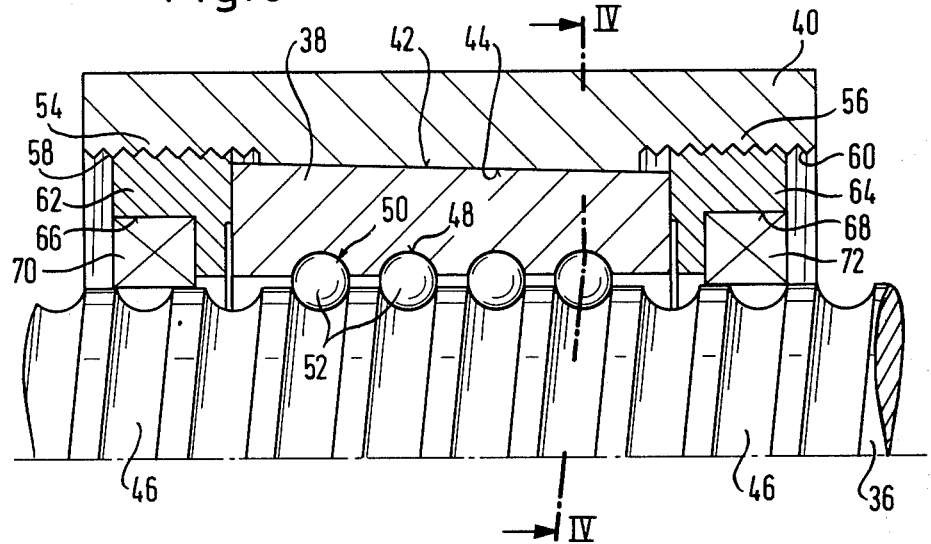
FIG. 3 is a longitudinal sectional view taken through a spindle drive mechanism having a spindle nut with a conical outer surface and a sleeve with a conical inner surface.

FIG. 3 shows an embodiment which again comprises a spindle 36, a spindle nut 38 and a sleeve 40 surrounding the nut 38. The spindle nut 38 is formed with a conical outer surface 42 and the sleeve 40 has a corresponding conical inner surface 44. The external thread 46 of the spindle 36 and the internal thread 48 of the spindle nut 38 form a ball duct 50 which is filled with balls 52.

The conical inner surface 44 is connected at both ends of the sleeve to cylindrical portions 54,56 which are each provided with internal threads 58,60. Screw rings 62,64 may be screwed into these internal threads until they bear against the spindle nut 38. By means of the screw rings, it is possible to change the axial position of the spindle nut 38 in the sleeve 40 and, accordingly, the extent of the diameter reduction of the spindle nut. In order, for example, to readjust a play in the spindle drive or to obtain an initial tension, the screw ring 64 may be loosened and the spindle nut 38 further pressed into the sleeve 40 by tightening of the screw ring 62. Thus, the diameter of the sleeve may be further reduced. When the play is eliminated or when the desired initial tension is obtained, the screw ring 64 may once again be brought into contact with the spindle nut 38 and this adjustment will be maintained. If, for example, a cone angle of 1:50 and a pitch of 2 mm for the threads 58,60 are selected, the diameter of the spindle nut 38 is changed by 0.04 mm during a rotation of the screw rings 62,64. Of course, there may occur a reduction or expansion depending upon the direction of rotation.

As will be seen from FIG. 3, the screw rings 62, 64 are each provided with an inner step 66,68 each having therein a sealing ring 70,72. The sealing rings reach up to the spindle 36 and, as a result, there is provided a seal for the interior of the spindle 38 preventing the intrusion of chips, dirt or the like from the exterior of the device.

Figure 4:
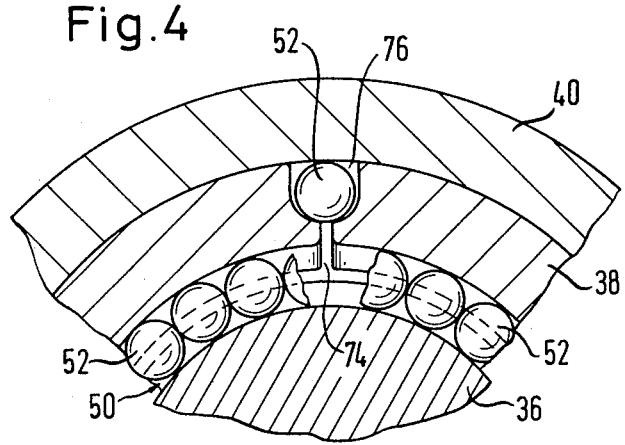
FIG. 4 is a sectional view taken along the line IV—IV of FIG. 3.

In this embodiment of the invention, the spindle nut 38 may also be constructed basically with a thin wall and the diameter may be reduced by elastic deformation. However, as will be particularly seen in FIG. 4, in the present embodiment the spindle nut 38 is provided with a compensating slot 74 which, for example, extends along a generating line. In this manner, even a relatively thick-walled spindle nut may be reduced in its diametral dimension with relatively small forces thus enabling elimination of play or obtaining of an initial stress level in the device. As will be seen further in FIG. 4, the compensating slot 74 seen in cross section has a widened portion which serves as a return duct 76 for the balls from the outlet of the ball duct 50 at one end face to the inlet thereof at the other end face.

Figure 5:
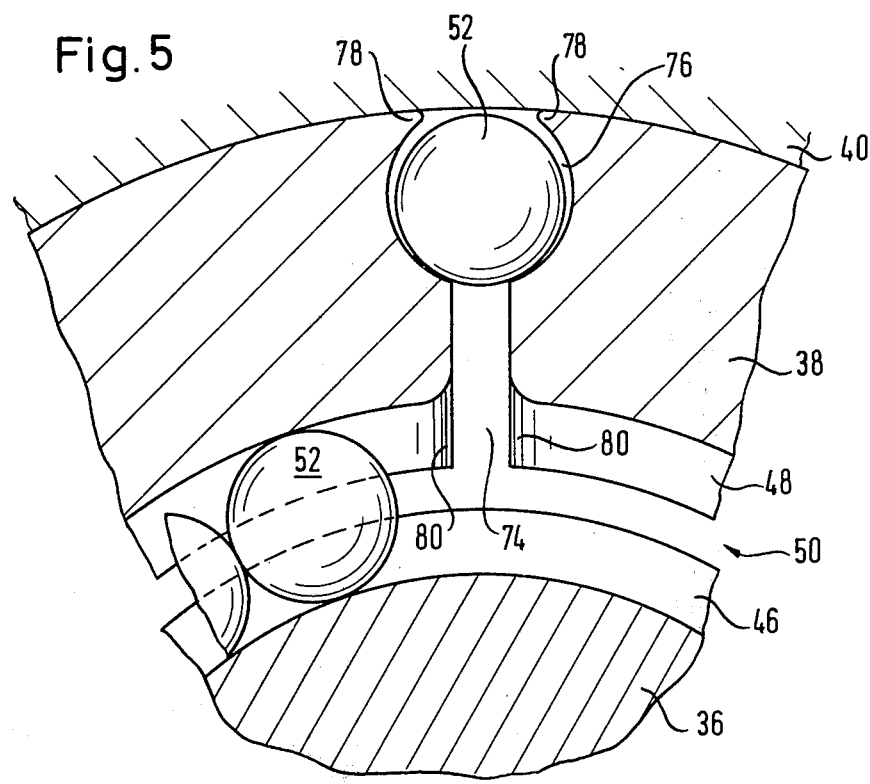
FIG. 5 is an enlarged sectional view showing in greater detail a portion of the region of the ball duct and compensating slot of the mechanism of FIG. 4.

As particularly shown in the enlarged detail view of FIG. 5, the return duct 76 may have radially outwardly narrowing edges 78 which prevent the balls 52 from falling out of the duct even when the sleeve 40 is not yet mounted. In order to ensure an essentially smooth movement of the balls 52 through the compensating slot 74, the internal threads 48 of the spindle nut 38 is provided with rounded portions 80 in the region of the compensating slot. The rounded portions are preferably provided along the entire cross section of the thread but always in the region of contact between the balls and the flanks of the thread.

Figure 6:
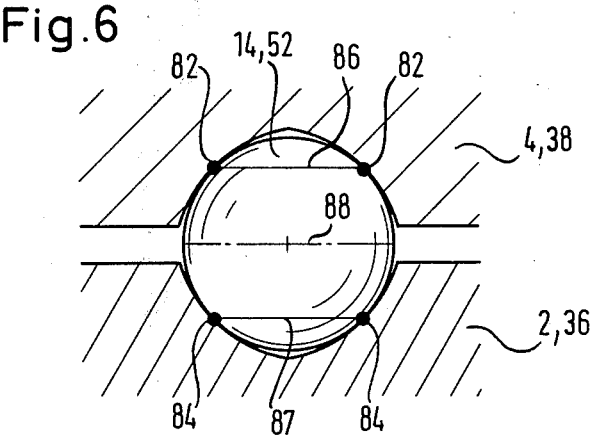
FIG. 6 is a sectional view showing in enlarged detail a region of the ball duct of the mechanism of FIG. 3.

The shape of the threads of the spindle and of the spindle nut are of essential importance. As will be seen in FIG. 6, the threads of the spindles 2 or 36 and of either of the spindle nuts 4 or 38 each have approximately a shape which resembles a pointed arch wherein two arched portions have a generally circular shape with radii which are larger than the radius of the ball. This shape ensures that each ball 14 or 52 touches each thread at two points 82 and 84 on both flanks. When adjusted so that there is no play between the spindle and the balls, on the one hand, or between the spindle nut and the balls on the other hand, it will thus be ensured that each of the balls will transmit forces in both feed directions. In the region of the contact points 82 and 84 of the balls, the flanks of the threads of the spindle and of the spindle nut are inclined approximately 45° relative to the spindle axis. The contact points are located approximately on 45° latitudinal circles 86 and 87 relative to the equitorial plane 88 extending through the balls parallel to the spindle axis. FIG. 6 shows a preferred embodiment of the invention. However, other shapes of threads are also conceivable and the threads may, for example, have the flanks forming a straight line as viewed in cross section.

Figure 7:
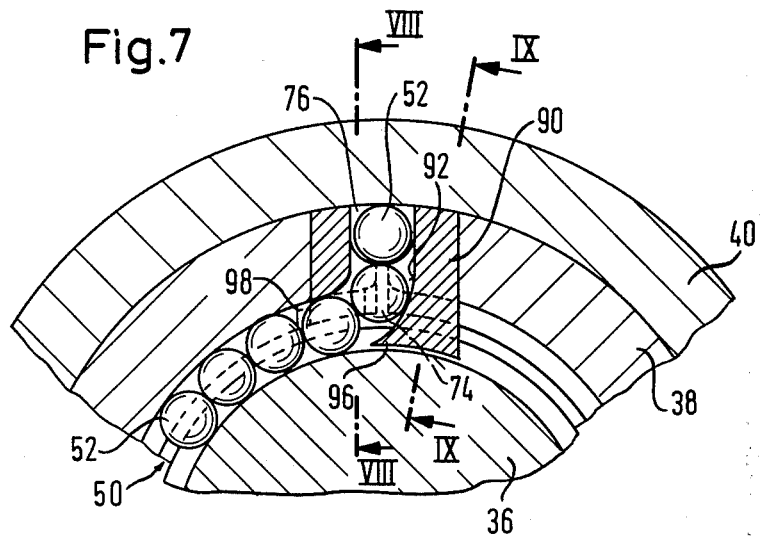
FIG. 7 is a cross-sectional view taken through a spindle drive mechanism in accordance with FIGS. 3-6 in the region of the end of the spindle sleeve.
Figure 8:
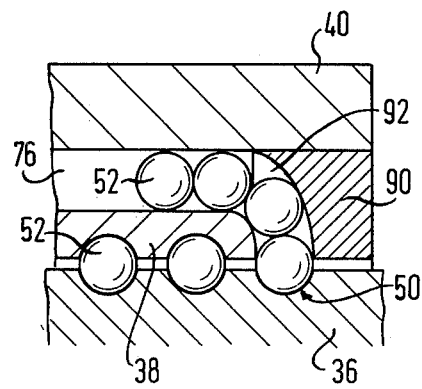
FIG. 8 is a sectional view taken along the line VIII—VIII of FIG. 7.
Figure 9:
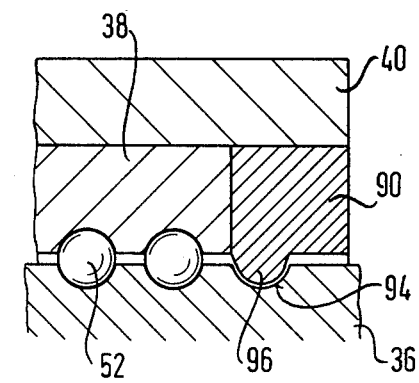
FIG. 9 is a sectional view taken along the line IX—IX of FIG. 7.

FIGS. 7 to 9 show in various representations of a spindle drive regions thereof at an end of the spindle nut where the transition from the last pitch of the ball duct 50 to the return duct 76 takes place. This transition is formed by a deflection piece 90 which is constructed as a unitary member with the spindle sleeve or, as shown in FIGS. 7 to 9, which can also be constructed as a separate insert piece. This deflection piece contains a curved duct 92 which effects the connection on the ball duct 50 to the return duct 76. A projection 96 extending from the spindle nut projects into the thread pitch 94 of the spindle 36. This projection 96 ensures a smooth deflection of the balls from the ball duct 50 into the curved duct 92. In the case of a reverse feed direction, the deflection piece 90 serves the purpose of guiding the balls 52 from the return duct 76 into the ball duct 50. To effect a smooth transition of the balls either from the ball duct 50 into the curved duct 92, or the reverse, the cross section of the transition of the ball duct is provided with a rounded portion 98. In order to avoid impairment of the reduction or expansion of the diameter of the spindle nut 38, the deflection piece 90 may be divided in alignment with the compensating slot 74 or it may have unilateral play in the slot of the spindle nut 38. However, the deflection piece may also be constructed of a material which may, for example, be plastic material which is easily deformable. Of course, in this case, the curved duct 92 in the deflection piece 90 must be overdimensioned relative to the ball diameter to such an extent that the balls can still travel even when the deflection piece 90 is compressed to the maximum possible degree. Of course, this requirement also applies to the return duct 76, as shown in FIG. 5. It should be further mentioned that at the other end of the spindle nut 38 there is arranged a corresponding deflection piece which, depending upon the feed direction, controls the inlet or outlet of the balls to or from the balls duct 50.

FIGS. 10 and 11 show another embodiment of means for deflecting the balls from the ball duct 50 into a return duct 176. For the indicated purpose, there is embedded in a spindle nut 138 a small deflection tube 100 which projects with a spoon-like projection 102 into the last thread pitch 104 of the spindle nut 138. These small deflection tubes can be constructed relatively short so that they merely form a connection between the ball duct 50 and the return duct 176. However, as in the illustrated embodiment, they may also be formed somewhat longer so that they will line the entire return duct 176. In this case, for example, two tubes are provided each of which extend from an end of the spindle nut to the center of the spindle nut. In order not to impair the compensating movement of the spindle nut during adjustment of the play, the compensating slot 74 also extends through the small tubes. Another possibility would be to arrange the small tubes with lateral play relative to the slot 176 or to construct the tubes elastically with the necessary overdimensioned inner diameter relative to the ball diameter.

Figure 12:
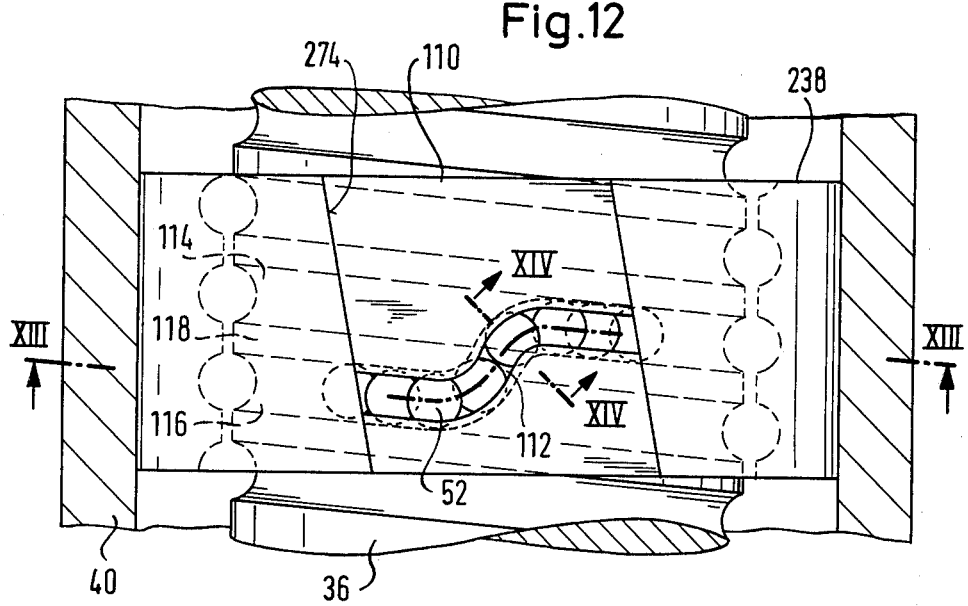
FIG. 12 is a top view of another embodiment of a spindle drive mechanism in accordance with the invention.
Figure 14:
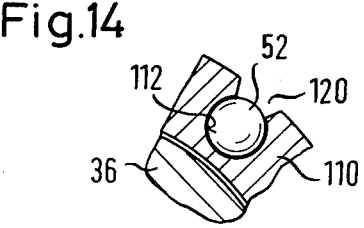
FIG. 14 is a sectional view taken along the line XIV—XIV of FIG. 12.
Figure 13:
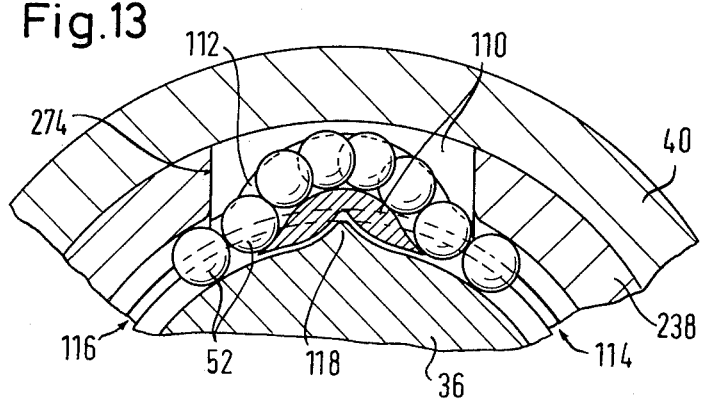
FIG. 13 is a sectional view taken along the line XIII—XIII of FIG. 12.

FIGS. 12 to 14 show an embodiment which differs from the embodiments previously described essentially with regard to the design of a spindle nut, particularly with regard to the means for returning the balls. Compared to the embodiments described above, the spindle nut 238 is provided with a significantly wider compensating slot 274. Into this compensating slot 274 there is inserted an insert piece 110 which extends over the entire length of the spindle nut 138. This insert piece 110 is provided with a plurality of return ducts which extend essentially in a circumferential direction. FIG. 12 shows only one of these return ducts 112. The number of return ducts corresponds to the number of thread pitches arranged within the spindle nut 238, with each of the thread pitches being connected by means of the return ducts to form a closed loop for the balls.

In FIG. 13 there is shown the arrangement whereby the balls 52 are guided through the return duct 112 and over a web 118 arranged between the two thread pitches 114, 116. FIG. 14 shows a sectional view taken through FIG. 12 wherein a cross section of the return duct 112 is illustrated in order particularly to illustrate that the return duct is open radially outwardly but is narrowed to such an extent that the balls 52 cannot fall therefrom. For the purposes of play adjustment, the insert piece may be made of elastic material which may, for example, be plastic material or it may be placed into the slot 274 with lateral play. In an embodiment alternative to the one shown in FIG. 14, the return ducts 112 may also be open inwardly and they may be closed toward the exterior thereof. In a further variation of this embodiment, the insert piece is not constructed in a single piece but a separate insert piece may be provided in each return duct. In this case, the insert pieces are preferably arranged distributed over the circumference to avoid a reduction in load capacity at a point of the circumference. In this variation, the play is adjusted through an additional narrow slot or a thin-walled nut having a diameter which is reduced. An embodiment will be described with reference to FIG. 22.

Figure 15:
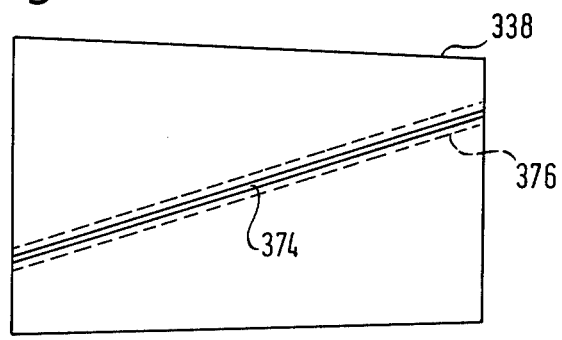
FIGS. 15 and 16 are plan views of the spindle drive sleeves having differently configured compensating slots.

A spindle nut with a single compensating slot extending along a generating line is the simplest embodiment with respect to the production engineering for the device. However, for functional reasons, it may be advantageous to provide other embodiments of the compensating slot or slots. FIG. 15 shows a view of a spindle nut 338 in which the compensating slot 374 is arranged obliquely relative to the axis of the spindle nut. As a result, compared to the spindle nut which is slotted along a generating line, there will be a smaller radial resilience and reduction of the load capacity will be lessened. This compensating slot may again be provided with a widened portion which serves as a return duct 376, as illustrated in dotted lines.

Figure 16:
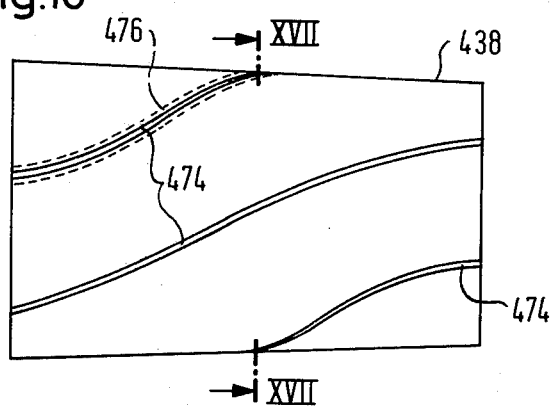
Figure 17:
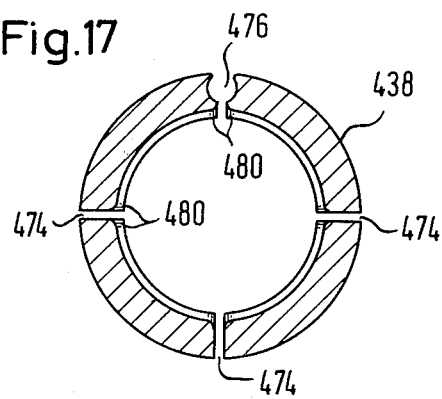
FIG. 17 is a sectional view taken along the line XVII—XVII of FIG. 16.

FIG. 16 shows a spindle nut 438 having a plurality of spirally arranged compensating slots 474. For the purpose of returning the balls, one of the slots may again be widened to form a return duct 476. A sectional view through such a spindle nut 438 is shown in FIG. 17. The compensating slots 474 are uniformly distributed over the circumference of the spindle nut and to ensure a smooth transition of balls past the compensating slots, each of the compensating slots is provided with rounded portions 480. As seen in cross section in FIG. 17, the upper compensating slot is widened in order to serve as a return duct 476 for the balls. The deflection pieces for the transition of the balls from the ball ducts into the return ducts may, for example, be constructed as illustrated in FIGS. 7 to 11 and they are not, therefore, shown in detail. The arrangement of several compensating slots may be advantageous since a better roundness of the spindle nut is ensured in all states of diameter reduction.

Figure 18:
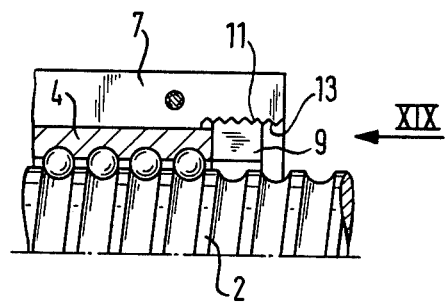
FIG. 18 is a partial longitudinal sectional view corresponding approximately to the view of FIG. 1 showing a slotted screw ring for axially securing the spindle or nut.

In FIG. 18 there is depicted an arrangement which corresponds essentially with the arrangement shown in FIG. 1 wherein a spindle nut 2, a spindle nut 4 and a sleeve 7 surrounding the spindle nut are provided. However, unlike FIG. 1, the spindle nut is secured in regard to axial movement toward the right by means of a screw ring 9 which, with an external thread 11, is threadedly engaged with an internal thread 13 provided in the sleeve 7 with the threaded engagement operating to permit the screw ring 9 to bear against the spindle nut 4.

Figure 19:
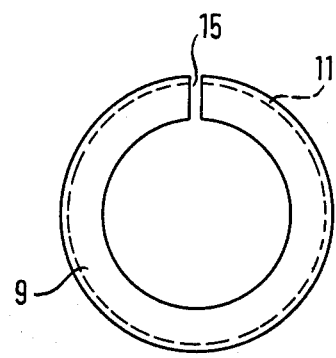
FIG. 19 is a view of the screw ring of FIG. 18 as viewed in the direction of the arrow XIX.

FIG. 19 is a view of the screw ring 9 as seen in the direction of the arrow XIX of FIG. 18. At one location, the screw ring is provided with a slot 15 which enables the screw ring to follow a diameter reduction of the sleeve 7.

Figure 20:
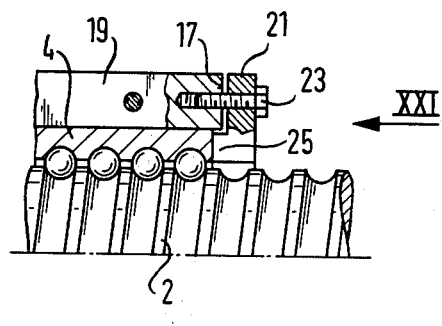
FIG. 20 is a partial longitudinal sectional view corresponding approximately to the view of FIG. 1 showing a flanged cover for axially securing the spindle nut.
Figure 21:
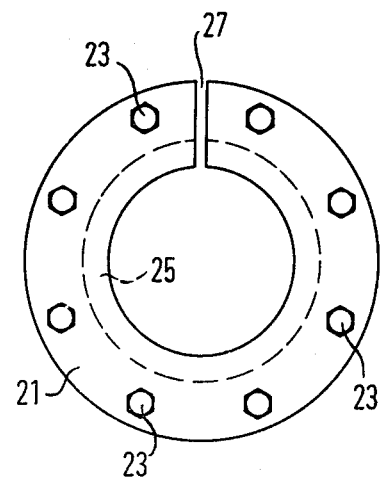
FIG. 21 is a view of the flanged cover of FIG. 20 taken in the direction of the arrow XXI.

A further embodiment of the invention shown in FIGS. 20 and 21 is provided with a flanged cover 21 which, by means of screws 23, acts against the end face 17 of the slotted sleeve 19 for securing the spindle nut 4 in the axial direction. The flanged cover 21 rests against the spindle nut at an axial collar 25 and a slot 27 allows the flanged cover 21 to follow the diameter reductions of the sleeve 19. The flange cover 21 is preferably fastened in such a manner that the slot 27 is in alignment with the slot of the sleeve.

Figure 22:
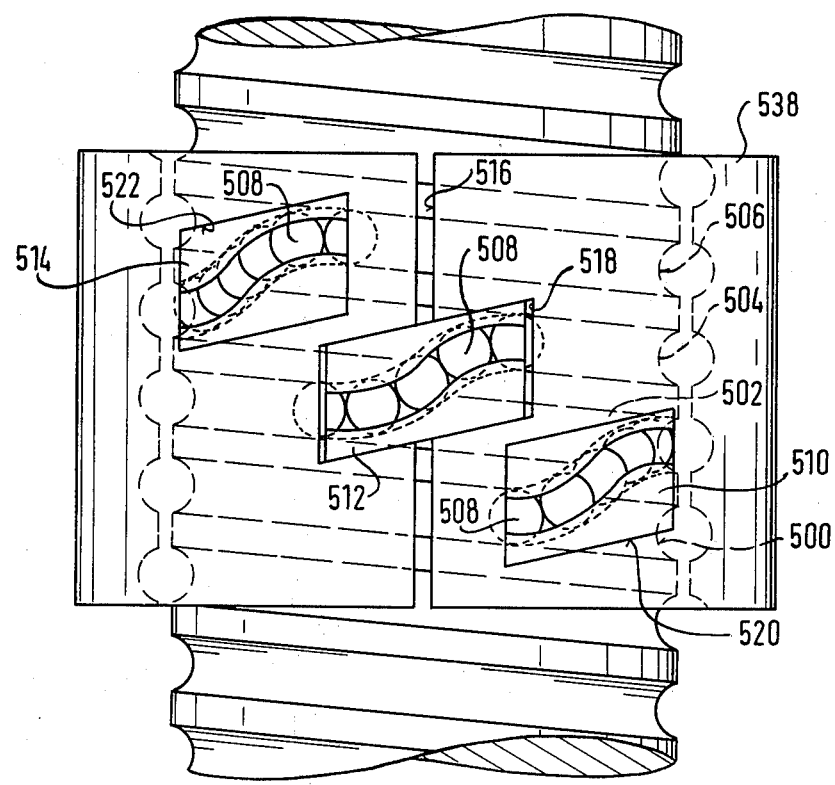
FIG. 22 is a top view of a spindle mechanism showing a spindle nut having several inserts for ball deflection, the inserts being circumferentially staggered.

FIG. 22 shows a spindle nut 538 which surrounds four complete thread pitches 500, 502, 504 and 506. After each rotation, the balls 508 are returned from the end of thread pitch to the start of the thread pitch. For this purpose, there are provided several inserts 510, 512, 514 which are arranged in a staggered position in the circumferential direction. The staggered arrangement prevents an excessive reduction in load capacity since an eccentricity between the spindle 2 and the spindle nut 538 is avoided and since, accordingly, the balls 508 will be uniformly loaded over the entire circumference. The play of the spindle drive is adjusted, for example, by reducing the diameter of the spindle nut which, for this purpose, is provided with a compensating slot 516 which may extend through the opening 518 in the spindle nut 538, the opening 518 being cut into the spindle nut 538 for receiving an insert such as, for example, the insert 512. The openings 520, 522 for receiving the inserts 510, 514 are not connected with the opening 518. As shown in FIG. 22, the insert 512 is placed into the opening 518 with play in the circumferential direction in order not to impair a diameter reduction of the spindle nut.

Figure 23:
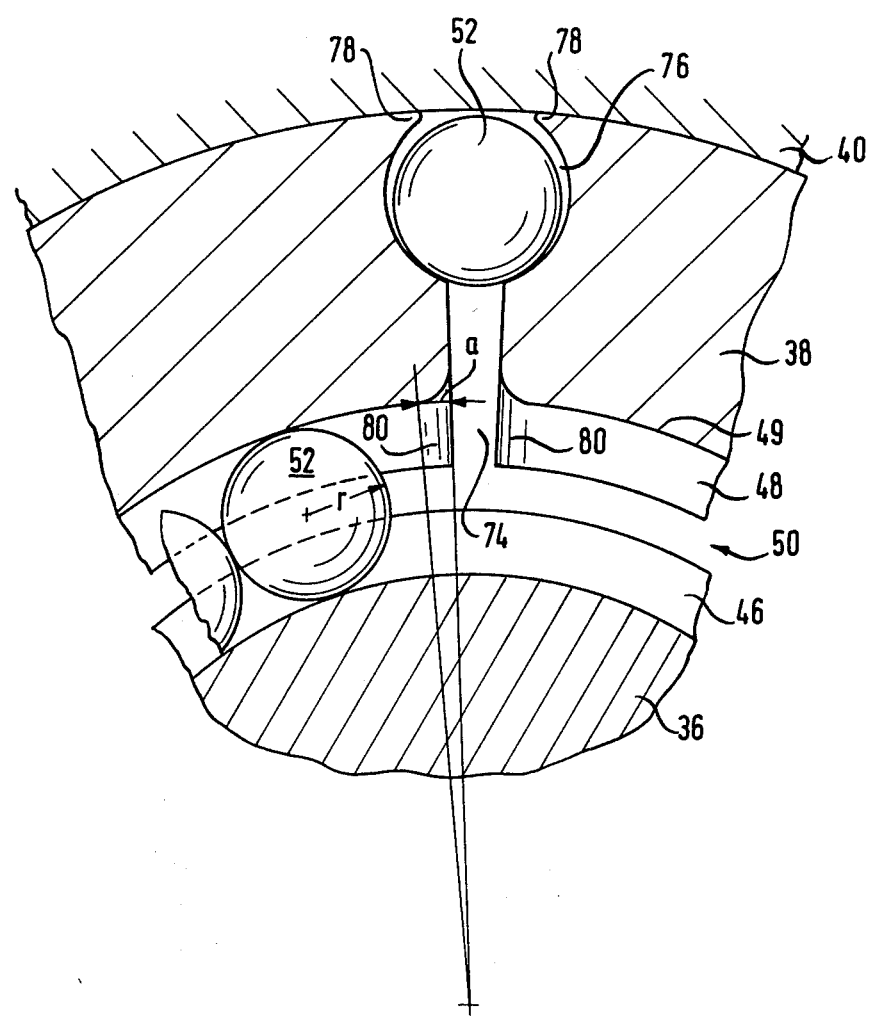
FIG. 23 is a partial sectional view which is a supplement to the view of FIG. 5.

FIG. 23 is a view which will supplement the view of FIG. 5. In FIG. 23 there is illustrated the fact that rounded portions 80, measured at grooved bottoms 49, extend over an arc of an angle a which is smaller than a radius r of the balls 52.

Outside of the region of the compensating slot 74 and the rounded portions 80, the internal thread 48 of the spindle nut engages the balls 52 even when the spindle nut is under tension. In other words, outside of the region of the compensating slot 74 and the rounded portions 80, the balls will have no play in the axial direction within the ball ducts 50. This means that all balls are used for force transmission in the axial direction, with the exception of those balls which are at the time in the region of the slot 74 or the rounded portions 80. This accomplishment is achieved in that the internal thread 48, even when the spindle nut 38 is under tension, is followed by a cylindrical surface which is determined by the radius of the groove bottom 49.

While specific embodiments of the invention have been shown and described in detail to illustrate the application of the inventive principles, it will be understood that the invention may be embodied otherwise without departing from such principles.

What is claimed is:

1. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said internal and external thread means each being constructed in the form of grooves having flanks which approach each other obliquely at the groove bottoms, each of said grooves being shaped to engage said balls at two points of contact.

2. A mechanism according to claim 1 wherein said spindle nut means is formed with a cylindrical outer surface, said spindle nut means being surrounded by a sleeve having a corresponding cylindrical inner surface, said sleeve being provided with at least one longitudinal slot and being adjustable in its diameter by means of the screw devices bridging said longitudinal slot of said sleeve, with means being provided for axially fixing said spindle nut means relative to said sleeve.

3. A mechanism according to claim 2 wherein said means for axially fixing said spindle nut are formed from two locking rings adapted to be engaged within grooves constructed in said inner surface of said sleeve.

4. A mechanism according to claim 2 wherein said means for axially fixing said spindle nut are formed of a stop member rigidly attached at an end of said sleeve and by a locking ring adapted to be inserted in an opposite end of said sleeve.

5. A mechanism according to claim 2 wherein said means for axially fixing said spindle nut means comprise at least one slotted screw ring which may be threadedly engaged into said sleeve at an end of said spindle nut means.

6. A mechanism according to claim 2 wherein said means for axially fixing said spindle nut means comprise at least one flanged cover which may be threadedly engaged to an end face of said sleeve at an end of said spindle nut means and which rests against said spindle nut means with an axial collar provided thereon.

7. A mechanism according to claim 1 wherein said compensating means comprise slot means formed in said spindle nut means and extending essentially longitudinally thereof.

8. A mechanism according to claim 7 wherein said slot means comprise at least one compensating slot formed to extend longitudinally of said spindle nut means along generating lines.

9. A mechanism according to claim 7 wherein said slot means comprise at least one compensating slot formed to extend longitudinally of said spindle nut means obliquely relative to the axis of said spindle nut means.

10. A mechanism according to claim 7 wherein said slot means comprise at least one compensating slot formed in said spindle nut means to extend spirally relative to the axis thereof.

11. A mechanism according to claim 1 wherein said internal thread means of said spindle nut means is divided into a plurality of thread sections, each of said sections having a beginning portion and an end portion connected to each other through a return duct.

12. A mechanism according to claim 11 wherein said thread means of said spindle nut means is divided into a number of thread sections corresponding to the number of thread pitches thereof.

13. A mechanism according to claims 1 or 11 wherein said compensating means comprise at least one compensating slot extending longitudinally relative to said spindle nut means with said at least one compensating slot being provided at its end with deflection pieces for deflecting said balls from a last thread pitch into said ball circulating means.

14. A mechanism according to claim 13, wherein said deflection pieces are mounted in said spindle nut means in an assigned location with play in the circumferential direction.

15. A mechanism according to claims 1 or 11 wherein said balls are received in said ball duct means with an interengagement which is devoid of play in the axial direction of said spindle nut means over the entire circumference of said spindle nut means.

16. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said spindle nut means comprising a spindle nut which is constructed as a single unitary piece undivided transversely to the direction of its axis.

17. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said spindle nut means being formed with a conical outer surface surrounded by a sleeve having a corresponding conical inner surface, with means being provided for axially pressing said spindle nut means relative to said sleeve for the purpose of diameter reduction and to fix said spindle nut means in position therein.

18. A mechanism according to claim 17 wherein on both sides of said sleeve the conical surface is connected to cylindrical sections which are provided with an internal thread, with screw rings being provided adaptable to be screwed into said internal threads for adjusting and fixing the axial position of said spindle nut means in said sleeve.

19. A mechanism according to claim 18 wherein said screw rings are each arranged with an internal step for receiving therein a sealing ring to seal said spindle nut means relative to said spindle.

20. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said external and said internal thread means being formed in a configuration approximately in the shape of a pointed arch taken in cross section, said configuration having two arch portions shaped as circular arch sides having radii which are larger than the radius of said balls.

21. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said internal and external threads being in contact with said balls at points lying in a plane extending at approximately 45° relative to the axis of said spindle.

22. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; each of said balls being defined with an equitorial plane extending generally centrally thereof and parallel to the axis of said spindle means, said balls being in contact with flanks of said internal and external thread means at points located approximately on 45° latitudinal circles taken relative to said equitorial plane.

23. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said compensating means comprising slot means formed in said spindle nut means and extending essentially longitudinally thereof, said slot means including portions extending internally of said spindle nut means and being provided with rounded portions at said internal regions for effecting smooth travel of said balls relative thereto.

24. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said compensating means comprising slot means formed in said spindle nut means and extending essentially longitudinally thereof, said slot means being formed with a widened portion formed as part of said ball circulating means for returning said balls from said ball outlet means to said ball inlet means of said ball duct means.

25. A mechanism according to claim 24 wherein said widened portions are narrowed taken in a radial direction outwardly and inwardly thereof to an extent that said balls are secured within said widened portions with regard to radial movement outwardly thereof.

26. A mechanism according to claim 24 wherein said return duct is defined by an insert arranged in a slot extending along the length of said spindle nut means.

27. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said compensating means comprising slot means formed in said spindle nut means and extending essentially longitudinally thereof; said slot means comprising at least one compensating slot formed in said spindle nut means and constructed to receive an insert; said mechanism further comprising an insert engaged within said compensating slot and including a deflection duct for said balls wherein said deflection duct is open in a direction radially thereof.

28. A mechanism according to claim 27 wherein said deflection ducts are formed with a narrowing configuration taken radially thereof to an extent to secure radial positioning of said balls therein.

29. A mechanism according to claim 27 wherein said inserts are placed in said spindle nut means in an assigned location with play in the circumferential direction.

30. A spindle drive mechanism comprising: spindle means having external thread means formed thereon; spindle nut means having internal thread means formed thereon; said external and internal thread means being of equivalent pitch and defining therebetween ball duct means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said ball inlet and ball outlet means being defined by small guide tubes mounted in said spindle nut means.

31. A mechanism according to claim 30 wherein said small guide tubes are placed in said spindle nut means in an assigned location with play in the circumferential direction.

32. A spindle drive mechanism comprising: spindle means; spindle nut means having internal thread means formed thereon, said internal thread means defining ball duct means together with said spindle means; a plurality of circulating balls operatively engaged within said ball duct means for effecting transmission of axial forces between said spindle means and said spindle nut means upon relative rotative movement therebetween; ball circulating means including means defining ball inlet means and ball outlet means in said ball duct means for effecting circulation of said balls through said ball duct means and between said ball outlet means and said ball inlet means; and compensating means for enabling adjustment of the diametral dimension of said spindle nut means to effect adjustment of the operating pressure between said spindle means and said spindle nut means thereby to provide for compensation of the degree of play between said balls and said ball duct means; said compensating means comprising slot means formed in said spindle nut means and extending essentially longitudinally thereof; said slot means including portions extending internally of said spindle nut means, said slot means being provided with rounded portions at said internal regions for effecting smooth travel of said ball relative thereto.

33. A mechanism according to claims 23 or 32 wherein said rounded portions formed on the internal sides of said compensating slots extend through an arc having an angular extent which is smaller than the diameter of said balls.

34. A mechanism according to claims 33 or 22 wherein said angular extent of said arc of said rounded portions is smaller than the radius of said balls.

* * * * *

UNITED STATES PATENT OFFICE
CERTIFICATE OF CORRECTION

Patent No. 4,274,297     Dated June 23, 1981

Inventor(s) Günter Blaurock and Ernst Albert

It is certified that error appears in the above-identified patent and that said Letters Patent are hereby corrected as shown below:

In the heading of the patent [75] should read as follows:

[75] Inventors: Günter Blaurock, Niederwerrn;
Ernst Albert, Sand, both of
Fed. Rep. of Germany Signed and Sealed this Thirteenth Day of October 1981

[SEAL]

Attest:

GERALD J. MOSSINGHOFF

Attesting Officer     Commissioner of Patents and Trademarks